United States Patent [19]
Olson

[11] Patent Number: 4,602,180
[45] Date of Patent: Jul. 22, 1986

[54] INSULATED ARMATURE COIL FOR DYNAMOELECTRIC MACHINE

[75] Inventor: Hjalmar A. Olson, North East, Pa.

[73] Assignee: General Electric Company, Erie, Pa.

[21] Appl. No.: 689,217

[22] Filed: Jan. 7, 1985

[51] Int. Cl.[4] .............................................. H02K 3/30
[52] U.S. Cl. ..................................... 310/215; 310/43; 310/201
[58] Field of Search ................. 310/208, 214, 215, 43, 310/45, 194, 196, 198, 201, 203, 208; 174/95, 97, 113 R, 113 AS, 117 R

[56] References Cited

U.S. PATENT DOCUMENTS

| | | | |
|---|---|---|---|
| 1,605,112 | 11/1926 | Huggins | 310/214 |
| 2,085,099 | 6/1937 | Jones | 171/228 |
| 2,675,421 | 4/1954 | Dexter | 174/117 |
| 2,697,055 | 12/1954 | Finholt | 154/80 |
| 2,705,292 | 3/1955 | Wagenseil | 310/196 |
| 2,921,207 | 1/1960 | Fletcher | 310/208 |
| 2,991,328 | 7/1961 | Lay | 174/72 |
| 3,334,255 | 8/1967 | Peters | 310/215 |
| 3,662,199 | 5/1972 | Anderson et al. | 310/208 |
| 4,282,450 | 8/1981 | Eckels | 310/52 |
| 4,376,904 | 3/1983 | Horrigan | 310/208 |
| 4,486,506 | 12/1984 | Kenjo et al. | 310/215 |

FOREIGN PATENT DOCUMENTS

| | | | |
|---|---|---|---|
| 162224 | 4/1903 | Fed. Rep. of Germany | 174/95 |
| 547733 | 4/1932 | Fed. Rep. of Germany | 310/215 |
| 1135514 | 12/1956 | France | 174/97 |
| 54-5592 | 1/1979 | Japan | 174/95 |
| 359478 | 2/1962 | Switzerland | 310/215 |

OTHER PUBLICATIONS

D. H. Berkebile & D. L. Stevenson "The Use of Kapton Polyimide Film in Aerospace Applications"—SAE Conf. Record, pp. 3562-3568 (1982)—Preprint No. 811091.

*Primary Examiner*—Patrick R. Salce
*Assistant Examiner*—D. L. Rebsch
*Attorney, Agent, or Firm*—Albert S. Richardson, Jr.

[57] ABSTRACT

A multiple turn coil adapted to be inserted in a slot of a rotor in a dynamoelectric machine is formed by a bundle of individually insulated parallel bars of electroconductive material arranged close together and surrounded, in the vicinity of each slot section of the coil, by a pre-formed tube of substantially non-compressible, non-thermoplastic dielectric material (e.g., polyimide film), the wall of which is thin and flexible enough to bend in any plane and smooth enough to permit substantially unfettered longitudinal expansion and contraction of the insulated conductors inside the tube. Inside the coil a cross-shaped member of the same dielectric material enhances the turn-to-turn insulation.

18 Claims, 8 Drawing Figures

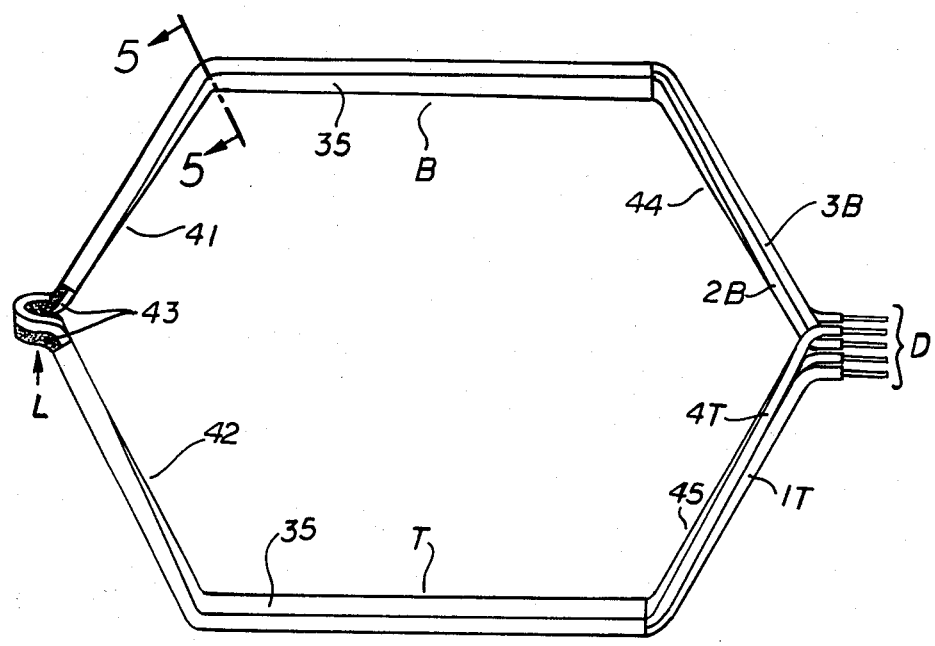
FIG. 4
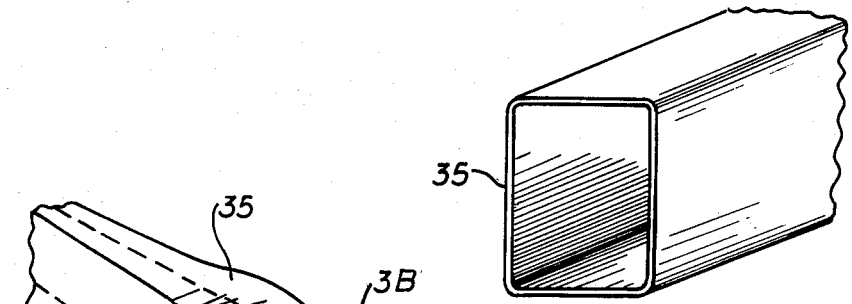
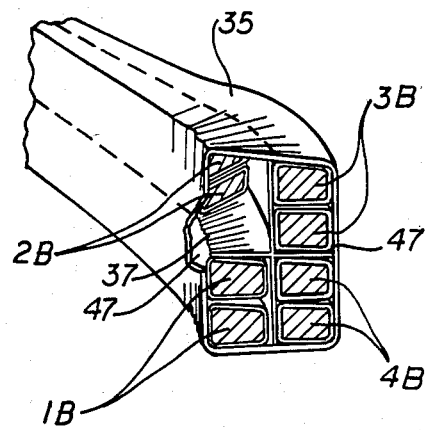
FIG. 5
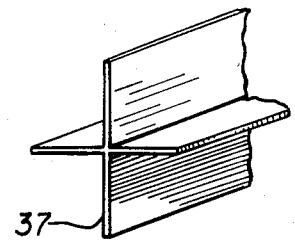
FIG. 6
FIG. 7

INSULATED ARMATURE COIL FOR DYNAMOELECTRIC MACHINE

BACKGROUND OF THE INVENTION

This invention relates generally to rotating dynamoelectric machines, and it relates more particularly to improvements in the electrical insulation of an armature coil for the rotor of such a machine.

In large, relatively high horsepower direct current (d-c) dynamoelectric machines such as locomotive traction motors, the armature comprises a rotatable, cylindrical core of ferromagnetic laminations having a plurality of slots in its periphery for receiving armature coils that are electrically connected to an external circuit via a rotating commutator and cooperating stationary brushes. Each armature coil has multiple individual turns. It typically is formed by covering each of a plurality of long, thin copper bars with suitable dielectric material to provide turn-to-turn insulation, binding a set of eight (more or less) of these bars in parallel and bending the set into a generally rectilinear winding whose opposite sides are straight and parallel, and then covering the winding with a sheath of suitable dielectric material so as electrically to insulate the bundle of juxtaposed bars from the exposed edges of the core laminations that define the sidewalls and bottoms of the slots in which the straight sides of the coil are placed and that are at ground potential. There are several known techniques for applying the turn-to-ground insulating sheath on a multiple turn armature coil. One is to wrap each of the straight sides of the bundle of copper bars (i.e., the slot section of the coil) in multiple layers of a thin sheet of dielectric material; see prior art U.S. Pat. Nos. 2,675,421 and 2,697,055. In a second known method, each slot section is encased between a pair of complementary, pre-formed, relatively inflexible channel-shaped members of dielectric material; such members are easy to manufacture and assemble but provide relatively poor creepage to ground. A third method is to spiral wrap the sides of the coil in insulating tape. The third method can be used either alone, in combination with the first method (see U.S. Pat. No. 3,662,199), or in combination with the second method.

Whatever method is used, the turn-to-ground insulation of an armature coil needs to have sufficient dielectric strength, thickness, and integrity to prevent electrical breakdown (i.e. short circuits) from any turn in the coil to ground under all possible environmental conditions which, for a locomotive traction motor, include constant vibration, frequent mechanical shocks, occasional electrical overloads, a wide range of ambient temperatures, and an atmosphere that can be very wet and/or dirty. And the desired insulating properties need to be maintained, without appreciable deterioration, as the machine ages and in spite of cyclic changes, due to temperature excursions, in the length of each slot section of the coil relative to the longitudinal dimension of the sidewalls of the associated slot. (As is well known, each time the average magnitude of armature current is increased to its full-load rating, the heating effect of this current will cause the copper bars in the coil to expand, and the amount of such expansion differs from that of the laminated core which initially is cooler than the coil and which in any event has a different coefficient of thermal expansion.)

Good heat transfer is another generally desirable characteristic of the insulating system. This characteristic is particularly significant in traction motors where the goal is to obtain more output torque per unit of weight. To help attain this goal, any one or combination of the following possible changes to the armature of the motor is desirable: (1) increase the cross-sectional area of the copper bars in each armature coil for a slot of given size, thereby allowing the coil to conduct more current without increasing current density; (2) increase the current density (and consequently the heat generated) in the bars; (3) decrease the depth of each slot so that bars of given cross-sectional area are located closer to the surface of the core and hence closer to the field poles of the machine. But none of these changes can be achieved without reducing the thickness of the turn-to-ground insulation of the armature coil. The thinner the outer sheath of insulation on the armature coil, the more space for the copper bars inside the sheath and the better the transfer of heat from the bars to the rotor core. By thus reducing the generation of heat and/or promoting its dissipation, the armature coil can carry more current (and the motor can therefore develop more torque) without exceeding a given maximum safe temperature rise.

An insulating material that is particularly advantageous for traction motor applications is known generically as Type H polyimide film. An FEP-fluorocarbon resin coated form of such film is manufactured and sold by Dupont Company under its trademark "Kapton." Thin gauge Kapton insulation is very flexible, has a relatively high dielectric strength (typically at least 3,000 to 4,000 volts per mil), and remains physically and electrically stable at elevated temperatures. The coating of FEP-fluorocarbon resin (popularly known by the Dupont trademark "Teflon") provides a very smooth, heat-sealable surface on the base of the polyimide film. This also improves the chemical resistance of the film and reduces the rate of moisture permeability and of oxidative decomposition. Such composite material has been heretofore used successfully to insulate rectangular motor magnet wire and to insulate the field coils of locomotive traction motors (see U.S. Pat. No. 4,376,904-Horrigan). Precision motors have heretofore used slot liners made of H film. For more information about Kapton and its typical prior uses, see the paper by D. H. Berkebile and D. L. Stevenson titled "The Use of 'Kapton' Polyimide Film in Aerospace Applications" published in 1982 by the Society of Automotive Engineers at pages 3562–68 of its Conference Record of an SAE meeting on Oct. 5–8, 1981 (preprint No. 811091).

SUMMARY OF THE INVENTION

A general objective of the present invention is to provide an improved insulating system for the armature coils of dynamoelectric machines.

Another objective is the provision of an armature coil having a sheath of turn-to-ground insulation characterized by a relatively thin wall which has a high dielectric strength, by good creepage to ground, and by the absence of troublesome binding or abrasion between the inside surface of the sheath and the coil conductors when the latter expand or contract longitudinally.

A further objective is the provision of a multiple turn armature coil having turn-to-turn insulation that is relatively small in size and optimal in location.

It is yet another object of the invention to provide an armature coil insulating system that effectively utilizes the beneficial characteristics of polyimide film.

In carrying out the invention in one form, each armature coil on the rotor of a dynamoelectric machine comprises a bundle of parallel, separately insulated conductors of generally rectangular cross section that is bent in a generally rectilinear configuration having first and second relatively long and straight slot sections that are respectively adapted to be inserted in separate slots in the periphery of a cylindrical core of the rotor. At one end of the rotor the first and second slot sections of the bundle of conductors are respectively joined to first and second shorter sections which form obtuse angles therewith and which in turn extend convergently to a point of intersection where they join one another via an acutely bent loop. Turn-to-ground insulation for the coil is provided by two pre-formed tubes of substantially non-compressible, non-thermoplastic dielectric material. The first tube surrounds the exterior surface of the first slot section and the adjoining shorter section of the bundle of conductors, whereas the second tube surrounds the exterior surface of the second slot section and the second shorter section.

Each of the aforesaid tubes fits snuggly but slidably over the surrounded sections of the bundle of conductors to provide electrical insulation between the bundle and the slot walls of the rotor core. The wall of the tube has a unitary, seamless, watertight construction that ensures virtually the same amount of insulation on all sides of each slot section of the coil and that provides good creepage to ground. The wall will not cold flow when radially inward pressure is applied to the coil during the slot closing (wedging) step of the manufacturing process. Furthermore, the wall is thin and flexible enough to bend in any plane without appreciable loss of either physical or dielectric integrity. Its thinness permits the respective conductors of the coil to have relatively large cross sectional areas and therefore to carry more current in a slot of given dimensions, and its thinness also enhances the transfer of heat from the conductors to the core. The wall of each tube is also characterized by a very smooth interior surface that provides a relatively slippery interface with the surrounded conductors, whereby the longitudinal expansion or contraction of the conductors inside the tube in service will not abrade or wear out the insulation.

Preferably each armature coil comprises at least four conductors which are arranged in quadrature with respect to each other, and there are four individual turns per bundle of conductors. Inside the coil the four conductors are separated from one another by turn-to-turn insulating means comprising a pre-formed unitary member of substantially non-compressible, non-thermoplastic dielectric material having a cross-shaped cross section. This member is thin and flexible enough to bend in any plane without appreciable loss of either its physical integrity or its electrical insulating properties, and it occupies only a very small space inside the coil. This permits the respective conductors of the coil to have larger cross sectional areas.

Preferably both the tubular turn-to-ground insulation and the cross-shaped turn-to-turn insulation comprise multiple layers of very thin polyimide film sealed together by fluorinated ethylene propylene (FEP) resin. In the case of the aforesaid tubes, the smoothness and slipperiness of the interior surface of the wall of the tube is enhanced by a coating of FEP.

The invention will be better understood and its various objects and advantages will be more fully appreciated from the following description taken in conjunction with the accompanying drawings.

BRIEF DESCRIPTION OF THE DRAWINGS

FIG. 4 is a plan view of a whole armature coil for the FIG. 1 rotor;

FIG. 5 is an enlarged cross-sectional view of the FIG. 4 coil, taken along lines 5—5 at a bend of the bottom slot section of the coil;

FIG. 6 is a perspective view of part of the pre-formed tube of dielectric material that surrounds each of the slot sections of the FIG. 4 coil in accordance with the present invention;

FIG. 7 is a perspective view of part of the pre-formed cross-shaped member of dielectric material that is disposed inside the coil to separate the four turns from one another in accordance with the present invention.

DESCRIPTION OF THE PREFERRED EMBODIMENT

Figure 1:
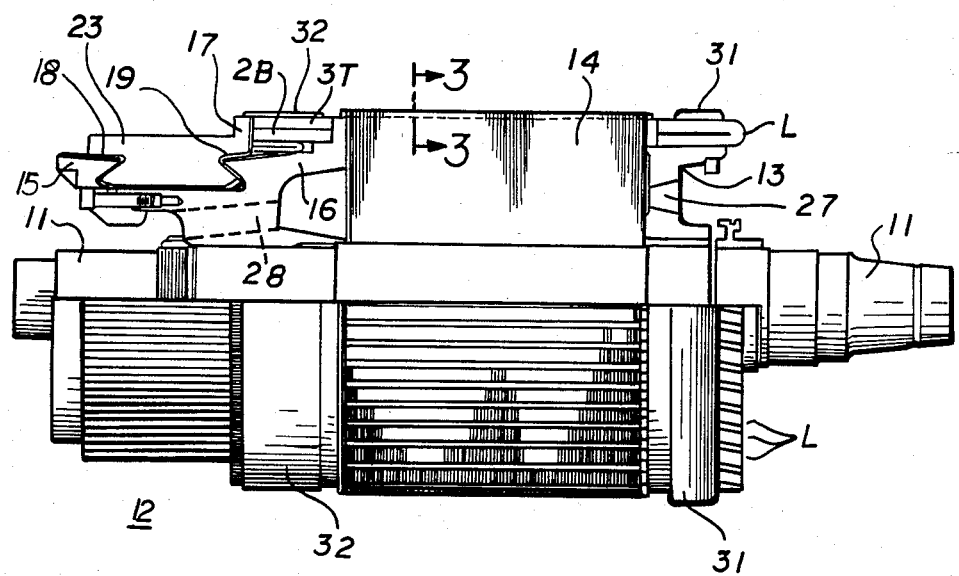
FIG. 1 is a simplified side elevation, partly in cross section, of the rotor of a rotating dynamoelectric machine such as a d-c motor, the rotor having a plurality of peripheral slots in which are disposed an equal plurality of armature coils embodying the present invention.

The rotor represented in FIG. 1 is well suited for use in a dynamoelectric machine such as a cylindrical d-c traction motor. The rotor has a shaft 11 that is supported in suitable bearings (not shown) for rotation about its axis. A conventional commutator 12 comprising a cylindrical array of discrete electroconductive segments or bars is mounted near one end of the shaft, and a ring-shaped armature head 13 is mounted near the opposite end. A cylindrical core 14 of magnetizable material is disposed on the shaft 11 between the commutator 12 and armature head 13. In practice, the core 14 actually comprises a stack of thin ferromagnetic laminations.

The commutator 12, as it is illustrated in FIG. 1, is a typical V-ring arch-bound type comprising an outer retaining ring 15 that is bolted to a cooperating ring 16 on the shaft 11 so as to capture the commutator segments therebetween. The inboard ends of the respective segments extend radially outwardly, thereby forming a cylindrical array of risers 17 to which the armature coils of the rotor can be conveniently connected. The commutator segments are usually made of copper, and they are electrically insulated from the two metallic retaining rings by means of a pair of annular commutator cones 18 and 19 of dielectric material that are respectively sandwiched between V-shaped notches at opposite ends of each segment and the respectively opposing rings 15 and 16. Each segment has an outwardly facing surface slidingly contacted by a carbon brush (not shown) as the rotor turns about the axis of its shaft 11. A profile of one of the segments is shown at 23.

For passing cooling air in an axial direction through the rotor, there is a ring of holes (see reference No. 27 in FIG. 1) in the armature head 13, a similar ring of holes (28) is provided in the retaining ring 16 of the commutator 12, and these holes register with passageways (not shown) through the core 14.

The rotor core 14 includes a plurality of axially extending slots 30 spaced apart from one another around its periphery. Physically inserted in these slots and electrically connected to selected commutator segments are an equal plurality of armature coils. In one embodiment of the invention 46 coils are used on the rotor of a d-c commutator motor having a continuous output rating in excess of 1,000 horsepower. Each armature coil actually comprises a bundle of parallel, elongated bars that are made of electroconductive material such as copper and that are individually covered with thin layers of electrical insulation such as Kapton. Each of these separately insulated bars or conductors has a generally rectangular cross section.

In a conventional manner, the bundle of parallel conductors is bent to form a generally rectilinear winding having two relatively long and straight slot sections B and T (see FIG. 4). The first slot section B of each coil is located in the bottom position of a core slot, whereas the second slot section T is located in the top position of a separate slot. These slot sections are interconnected at the closed end or bight of the coil by means of a loop L which slightly overhangs the outboard end of the armature head 13. The parts of each coil that adjoin the loop L and extend over the cylindrical perimeter of the armature head are encircled by conventional banding 31 which prevents radial movement thereof due to centrifugal force when the rotor shaft is turning at high speed.

At the open end of each coil, opposite ends of each of the bundled conductors are connected to selected segments of the commutator 12. More particularly, these distal ends D of the conductors are respectively connected to the risers of a predetermined set of the commutator segments. The parts of each coil that extend from the rotor core 14 to the commutator segments are tightly secured to the perimeter of the retaining ring 16 by a band 32 of insulating material. After all of its parts are assembled, the whole rotor is impregnated with insulating varnish by a conventional vacuum-pressure technique (VPI) and then baked at elevated temperature so as to cure the varnish which fills any voids in the assembly, thereby promoting heat transfer and water resistance.

In the illustrated embodiment, the armature coil is a polycoil having four individual turns, and the distal ends of the bundled conductors are so interconnected that the four turns are electrically in series with each other. This can be seen in FIG. 2 where the four turns of one coil are shown connected to a set of five consecutive commutator segments 21 through 25. As will be appreciated by a person skilled in the art, there are thin layers of dielectric material (not shown) interleaved with the commutator segments so as to provide electrical insulation between adjacent segments. The first turn of the coil has a top half 1T that is associated with the slot section T of the illustrated coil and a bottom half 1B associated with slot section B of the same coil. The distal end of the top half 1T is connected to commutator segment 21, and the distal end of the bottom half 1B is connected to the next segment 22. The second turn of the same coil also has top and bottom halves 2T and 2B, respectively, with the former being connected, in common with the bottom half 1B of the first turn, to the segment 22 and the latter being connected to the third commutator segment 23 of the set. Similarly, the third turn has top and bottom halves 3T and 3B connected between adjacent segments 23 and 24, and the fourth turn has top and bottom halves 4T and 4B connected between segments 24 and 25. FIG. 1 shows that the distal ends of both the bottom half 2B of the second turn and the top half 3T of the third turn are connected to the riser of the same segment 23.

Figure 2:
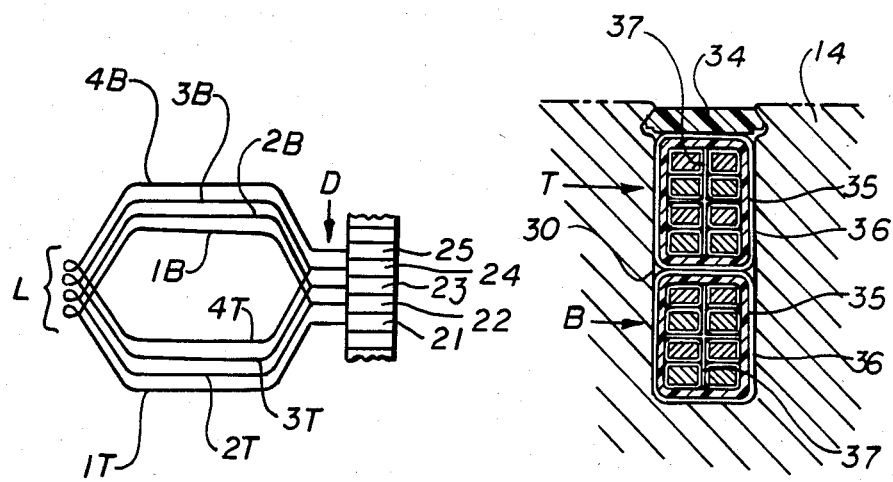
FIG. 2 is a simplified schematic electrical diagram of one of the armature coils of the FIG. 1 rotor, illustrating its four individual turns in series relationship with each other.

Inside each polycoil the four turns are physically arranged in quadrature with respect to each other, and the loop L at the bight of the coil inverts the turns so that the top and bottom halves of each turn are disposed in diagonally opposite quadrants. In practice each of the four individual turns shown in FIG. 2 is preferably split into two or more parallel paths provided by at least two juxtaposed insulated conductors, the corresponding ends of which share common electrical junctures.

Figure 3:
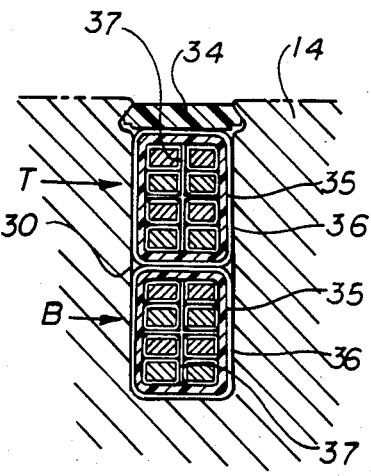
FIG. 3 is enlarged cross-sectional view of one of the slots in the core of the rotor of FIG. 1, illustrating that the first slot section of one coil is located in the bottom position of the slot underneath a second slot section of another coil.

FIG. 3 shows how the first slot section B of one armature coil and the second slot section T of another coil fit respectively into bottom and top positions of one of the slots 30 in the periphery of the rotor core 14. The open end or mouth of the slot 30 is closed by a conventional slot wedge 34 which retains the slot sections of both coils in place. Rotors of some machines have more armature coils than slots, in which case at lease one additional slot section may be placed in slot 30 between the illustrated sections B and T. By using improved manufacturing processes that ensure negligible dimensional disparities among the various bundles of conductors, the various wedges, and the various slots themselves, a tight fit is obtained without placing any prior art filler strips of insulating material between the wedge 34 and the top coil.

As is indicated in FIG. 3, each coil preferably comprises a bundle of eight separately insulated conductors, and the distal ends of these conductors are so interconnected that there are two parallel conductors per turn and four serial turns per coil. In accordance with the present invention, the exterior surface of each slot section of the bundle of conductors is surrounded by a pre-formed tube 35 of dielectric material. The significant characteristics of this tube will soon be described in conjunction with the description of FIGS. 4-6. Optionally, the coil is wrapped in a single, thin layer 36 of insulating tape which helps to protect the outside of each tube 35 from mechanical damage while the coil is being inserted into the slots. The function of the tube 35 is to provide electrical insulation between all of the coil's conductors and both the sidewalls of the slot 30 (i.e., turn-to-ground insulation) and the conductors in the adjacent slot section of the companion coil (i.e., coil-to-coil insulation). When the rotor is operating normally in a typical machine, its core 14 is usually at ground potential, whereas the electrical potential of the conductors comprising one of the armature coils can be as high as 1,400 volts with respect to ground and also with respect to the conductors in the adjacent slot section of a different coil.

In accordance with the present invention, the four turns of each coil are separated from one another by pre-formed unitary cross pieces 37 of dielectric material that are disposed inside the coil. This enhances the turn-to-turn electrical insulation that is provided by the insulating layers covering the individual conductors. In normal operation the potential difference between the conductors of consecutive turns is typically 50 volts, and therefore the potential of the fourth turn is approximately 150 volts different than that of the first turn of the same coil. The construction and advantage of the cross-shaped members 37 will be better understood from the later description of FIGS. 5 and 7.

The generally rectilinear configuration of the armature coil is clearly shown in FIG. 4. The first and second straight, parallel slot sections B and T of the coil are integrally joined at their armature head ends to first and second shorter sections 41 and 42, respectively. The shorter sections 41 and 42 of the coil extend at obtuse angles from the respective slot sections B and T to a point of convergence where they are joined together by the acutely bent loop L. Upon forming the loop L, the bundle of conductors is twisted a half revolution (180 degrees) so that the four turns of the coil are transposed at this point. As a result, the coil turn which occupies the lower inboard quadrant in the slot section B of the bundle of conductors (e.g., the turn whose bottom half is identified by the reference character 1B in FIG. 2) will occupy the upper outboard quadrant in the slot section T. In the illustrated embodiment of the invention, two diagonally opposite pairs of conductors are sheathed in flexible, short reinforcement sleeves 43 of insulating material (such as woven glass fibers) in the region of the loop L.

As is shown in FIG. 4, the slot sections B and T of the armature coil are respectively joined at their commutator ends to third and fourth shorter sections 44 and 45 which form obtuse angles therewith, and the latter sections of the coil in turn lead to the distal ends D of the individual conductors. In the vicinity of their distal ends the conductors are stripped of their insulating covers and are offset and flattened so as to be properly aligned and conditioned for making good contact with the risers of the set of commutator segments to which this armature coil will be connected when assembled with the other coils on the rotor.

In FIG. 4 the optional layer 36 of insulating tape on the outside of the illustrated coil has been omitted in order to reveal the disposition of the pre-formed tubes 35 of dielectric material. A first one of the tubes 35 surrounds the exterior surface of essentially the whole of the first slot section B of the bundled conductors and the exterior surface of at least part (and preferably the whole) of the adjoining shorter section 41. A second similar tube surrounds the exterior surface of essentially the whole of the second slot section T and the exterior surface of at least part (and preferably the whole) of the second shorter section 42. Each of these tubes fits snuggly but slidably over the exterior surface of the surrounded sections to provide electrical insulation between the bundle of conductors in the coil and the walls of the slot 30 in the rotor core 14.

As is best seen in FIG. 6, the wall of each pre-formed tube 35 has a generally rectangular cross section. It is made of a substantially non-compressible, non-thermoplastic material having a relatively high dielectric strength. The tube wall has a unitary, seamless construction, and it is thin and flexible enough to bend in any plane without appreciable loss of either its physical or its dielectric integrity. The interior surface of the wall is smooth enough to permit the bundle of conductors to move freely inside the tube as they expand and contract longitudinally in the core slot. In the presently preferred embodiment of the invention, these characteristics are obtained by forming the wall of the tube 35 from multiple layers of very thin polyimide film intimately bonded together by fluorinated ethylene propylene (FEP) resin. Plain polyimide film (Type H) has a dielectric constant of approximately 3.0 or higher at temperatures below 300° C. One brand of this material, known as Kapton Type F, includes a coating of FEP-fluorocarbon, known as Teflon, on one or both sides.

In the preferred embodiment of the invention, each tube 35 is pre-formed by wrapping a wide sheet of non-oriented Kapton (coated with FEP resin on both sides) approximately eight times around a mandrel of desired shape and length, applying pressure, heating the mandrel until the FEP resin melts (between 350° and 400° C.), cooling the mandrel to permit the resin to resolidify (at approximately 220° C.) which seals the adjoining layers of Kapton to one another, and then releasing pressure and removing the completed tube from the mandrel. Both internal and external sides of the wall of this pre-formed tube are coated with FEP which provides a very smooth surface that permits the tube to slide easily over the bundle of insulated conductors. Once the eight layers of the sheet of Kapton are cemented or fused together in the above-described manner to form the unitary, seamless wall of the tube, the wall will remain infusible and dimensionally stable when exposed to elevated temperatures during subsequent manufacture or operation of the rotor. It will not seize or bond to the insulated conductors inside the tube during the final VPI cure of the rotor. The tube wall has a substantially uniform thickness which is not greater than approximately 15 mils, and it will not cold flow or creep under pressure. In the presently preferred embodiment of the invention, the tube 35 is approximately two feet long, its inside dimensions are 0.64 inch high by 0.51 inch wide, and its wall is approximately 0.01 inch thick.

In the embodiment of the invention that is illustrated in FIG. 4, the tubes 35 do not extend beyond the coil sections B and T at the commutator end of the armature coil, and known insulating material (not shown) is usually wrapped around the bundle of conductors along the third and fourth shorter sections 44 and 45 of the coil to provide additional turn-to-ground insulation between each of these sections and the perimeter of the commutator retaining ring 16. However, in an alternative embodiment the pre-formed tubes 35 will be longer so that a tube surrounds the exterior surface of the bundle of conductors along part of each of the latter sections, thereby desirably increasing the electrical creepage distance that these tubes provide between the commutator end of the rotor core 14 and the conductors in the slot sections B and T of the coil.

Insulating means is disposed inside the armature coil for separating the four pairs of parallel, separately insulated conductors from one another at least in the vicinity of the loop L and of the obtuse angles at opposite ends of each of the slot sections B and T. As was described earlier in conjunction with FIG. 3, and as is shown more clearly in FIGS. 5 and 7, this insulating means comprises a pre-formed unitary member 37 of dielectric material having a cross-shaped cross section. In accordance with the present invention, the member 37 is made of substantially non-compressible, non-thermoplastic material that has a relatively high dielectric strength and that is thin and flexible enough to bend in any plane without appreciable loss of either its physical integrity or its electrical insulating properties. Preferably these characteristics are obtained by forming the member 37 from two layers of very thin polyimide film intimately bonded together by FEP resin. This can be done conveniently by feeding tapes of relatively narrow-width Kapton Type F film (coated with FEP resin on one side) through a die having four intersecting slots which conform to the desired cross section of the member 37, with each tape spanning a different pair of mutually perpendicular slots so that each of the four slots is filled with adjoining halves of two separate tapes having their coated sides facing each other, heating the die to a temperature above the melting point of the FEP resin, cooling the tapes before they exit the die to permit the resin to resolidify which seals the adjoining tapes to each other and thereby forms a unitary 2-ply crosspiece, and cutting the completed piece to the desired length. Preferably the cross-shaped member 37 is long enough to extend continuously along the loop L, along the whole length of both of the first and second shorter sections 41 and 42 of the coil, along the whole length of both of the slot sections B and T, and along an appreciable part of each of the third and fourth shorter sections 44 and 45.

The vertical and horizontal partitions of the pre-formed cross-shaped member 37 are actually only about one-fourth as thick as the wall of the previously described pre-formed tube 35. The vertical partitions provide extra insulation between the first and fourth turns of the coil and between the second and third turns. In FIG. 5 the first turn comprises the conductor pair 1B in the lower inboard quadrant of the first slot section B of the coil, the second turn comprises the conductor pair 2B in the upper inboard quadrant, the third turn comprises the conductor pair 3B in the upper outboard quadrant, and the fourth turn comprises the conductor pair 4B in the lower outboard quadrant of the same slot section. The thin layer of insulation that covers each of the eight conductors in the coil is represented in FIG. 5 by the reference No. 47. Preferably the insulating layer 47 is Kapton, and the FEP coating on its exterior surface cooperates with the FEP coating on the inside surface of the tube 35 to facilitate longitudinal movement by the bundle of conductors, with respect to the tube 35, when the conductors expand and contract due to thermal cycling in service. Note that the FEP coating also resists "wetting" by the varnish that is applied to the rotor during the final VPI cure, and therefore it prevents the conductors from being bonded to the inside of the tube 35 by the varnish that penetrates into this area from opposite ends of the tube.

The horizontal partitions of the cross-shaped member 37 provide extra turn-to-turn insulation between the first and second turns of the coils (conductor pairs 1B and 2B in FIG. 5) and between the third and fourth turns (conductor pairs 3B and 4B). This is particularly important at the loop L and at the four "corners" of the coil where the bundle of eight conductors is bent to form the obtuse angles at opposite ends of the parallel slot sections B and T. As is illustrated in FIG. 5, bending a conductor distorts its cross section, and a swelling or "upset" tends to develop in the inboard region of the conductor. The upset is most pronounced in the vicinity of the inside radius of the bend. Heretofore two diagonally opposite pairs of conductors have been wrapped in flexible reinforcement tape of insulating material at each corner of the coil to supplement the insulation on the individual conductors, thereby enlarging the gap between adjacent upset regions of conductor pairs 1B and 2B (and of pairs 3B and 4B), respectively. The crosspiece 37 of the present invention serves the same purpose. Being very thin, substantially incompressible and resistant to cold flow, and being located solely in the areas where the extra turn-to-turn insulation is required, the member 37 occupies less space than the prior art reinforcement tape and thereby permits larger conductors to be used in a core slot of given size. Upon bending the bundle of conductors to form a corner of the coil, wrinkles or creases are formed in the inboard horizontal partition of the member 37. The resulting ripples or crinkles are shown in FIG. 5. They desirably enhance the insulation between adjacent upset regions of the conductor pairs that occupy the two inboard quadrants of the coil.

A conventional hydraulic/pneumatic actuated coil forming machine is used to make the loop L and the other bends or corners of the armature coil shown in FIG. 4. Initially the bundle of eight parallel, separately insulated conductors is straight, and the distal ends D are not flattened. At this point in the coil forming process, the pre-formed cross-shaped member 37 is symmetrically positioned inside the bundle of conductors, and the two insulating sleeves 43 are put over diagonally opposite pairs of conductors half way between their opposite ends. The next step of the process is to bend and twist the bundle so as to form the loop L. Then the two pre-formed tubes 35 are put over the respective ends of the bundle which is still straight (except for the loop L). Ordinarily, because of the smooth interior surface of its wall, each tube 35 slides easily over the bundle of conductors. However, if some of the conductors are bowed, they will be forced compactly together in the process of assembling the tubes 35 onto the bundle. After putting the tubes 35 over opposite ends of the bundle of conductors, each end is bent at three separate places to form the shorter sections 41, 42, 44, and 45 and the straight, parallel slot sections B and T of the illustrated coil.

Figure 8:
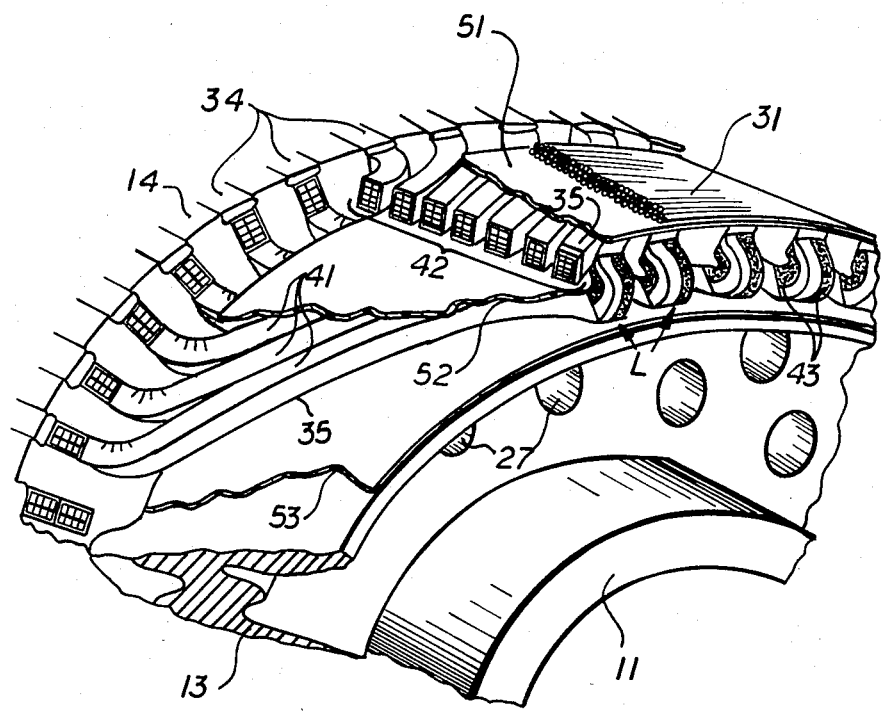
FIG. 8 is an enlarged and fragmentary perspective view of the armature head end of the FIG. 1 rotor, with the upper tier of the armature coils partially broken away to better show the lower tier and a layer of electrical insulation therebetween.

FIG. 8 shows how the first and second shorter sections 41 and 42 of the armature coil are securely banded to the perimeter of the armature head 13 of the rotor. The layer 36 of insulating tape that optionally covers the outside of each of the coils (and that provides a surface to which varnish adheres during the final VPI cure of the rotor) has been omitted in this figure. By surrounding the exterior surface of essentially the whole of each of the shorter sections 41 and 42 of each coil, the pre-formed tubes 35 of dielectric material are effective to provide electrical insulation between the armature head 13 and the bundle of conductors that the tubes envelop. The tubes also insulate the bottom tier of coil sections 41 from the top tier of sections 42, and they insulate the top tier from the banding 31. In practice the insulation provided by the tubes 35 is supplemented by a thin layer 51 of electrical insulating material between the banding 31 and the top tier, by another thin layer 52 of coil-to-coil insulation between the top and bottom tiers, and by a thin layer 53 of coil-to-ground insulation between the bottom tier and the armature head. In each instance, however, the supplementary layer of insulation can be significantly narrower and/or thinner than has heretofore been the case, thereby facilitating the transfer of heat from the conductors in the armature coils to the armature head and to the stream of cooling air. The tubes 35 ensure a very long creepage distance between the slot sections of each bundle of conductors and the outboard end of the rotor core 14.

While a preferred embodiment of the invention has been shown and described by way of example, many modifications will undoubtedly occur to persons skilled in the art. The concluding claims are therefore intended to cover all such modifications as fall within the true spirit and scope of the invention.

I claim:

1. For insulating an armature coil in a dynamoelectric machine having a rotor which comprises a commutator formed by a cylindrical array of discrete electroconductive segments at one end of the rotor, an armature head at the other end of the rotor, a cylindrical core of magnetizable material disposed between said commutator and armature head, said core including a plurality of axially extending slots in its periphery, a plurality of multiple turn armature coils physically disposed in the slots of said core and electrically connected to selected commutator segments, each armature coil comprising a bundle of parallel, separately insulated conductors the distal ends of which are adapted to be connected to a predetermined set of said commutator segments, each of said conductors having a generally rectangular cross section and said bundle being bent to form a generally rectilinear winding having first and second relatively long and straight slot sections that are adapted to be inserted in two separate slots of said rotor core, said first and second slot sections being respectively Joined at their armature head ends to first and second shorter sections which form obtuse angles therewith and which in turn extend convergently to the outboard end of the armature head where they join one another via an acutely bent loop, an improved insulating system comprising a first pre-formed tube of substantially non-compressible, non-thermoplastic dielectric material surrounding the exterior surface of essentially the whole of said first slot section and the exterior surface of at least part of said first shorter section of said coil, and a second pre-formed tube of the same material surrounding the exterior surface of essentially the whole of said second slot section and the exterior surface of at least part of said second shorter section of said coil, each of said tubes fitting snuggly but slidably over the exterior surface of the surrounded sections to provide electrical insulation between said bundle of conductors and the slot walls of said core, the wall of each tube having a unitary, seamless construction, being thin and flexible enough to bend in any plane without appreciable loss of either its physical or its dielectric integrity, and having a smooth enough interior surface to permit longitudinal expansion and contraction of said insulated conductors inside the tube.

2. An improved insulating system as in claim 1, in which said first tube surrounds the exterior surface of essentially the whole of said first shorter section and said second tube surrounds the exterior surface of essentially the whole of said second shorter section of said coil, whereby said tubes provide electrical insulation between said bundle of conductors and said armature head.

3. An improved insulating system as in claim 1 for a coil comprising at least four conductors arranged in quadrature with respect to each other, whereby there are four turns per bundle of conductors, in which insulating means is disposed inside said bundle for separating said four conductors from one another at least in the vicinity of said obtuse angles and of said loop, said insulating means comprising a pre-formed unitary member of substantially non-compressible, non-thermoplastic dielectric material having a cross-shaped cross section and being thin and flexible enough to bend in any plane without appreciable loss of either its physical integrity or its electrical insulating properties.

4. An improved insulating system as in claim 3, in which said pre-formed member comprises at least two layers of polyimide film bonded together by fluorinated ethylene propylene resin.

5. An improved insulating system as in claim 3 for a coil in which the distal ends of said conductors are interconnected in a manner that forms, in said bundle of conductors, four turns in series with each other.

6. An improved insulating system as in claim 5 for a coil in which each of said turns comprises at least two parallel conductors.

7. An improved insulating system as in claim 3, in which said insulating means extends along the whole length of both of said slot sections of said coil, along the whole length of both of said shorter sections, and along said loop.

8. An improved insulating system as in claim 1 for a coil in which said first and second slot sections of said coil are respectively joined at their commutator ends to third and fourth shorter sections which form obtuse angles therewith and which in turn lead to said distal ends of said conductors, and in which said first tube surrounds the exterior surface of at least part of said third section and said second tube surrounds the exterior surface of at least part of said fourth section.

9. An improved insulting system as in claim 8 for a coil comprising at least four conductors arranged in quadrature with respect to each other, whereby there are four turns per bundle of conductors, in which insulating means is disposed inside said bundle for separating said four conductors from one another at least in the vicinity of said obtuse angles and of said loop, said insulating means comprising a pre-formed unitary member of substantially non-compressible, non-thermoplastic dielectric material having a cross-shaped cross section and being thin and flexible enough to bend in any plane without appreciable loss of either its physical integrity or its electrical insulating properties.

10. An improved insulating system as in claim 9, in which said insulating means extends along the whole length of both of said slot sections of said coil, along the whole length of both of said first and second shorter sections, and along said loop.

11. An improved insulating system as in claim 1, in which the wall of each of said tubes has a generally rectangular cross section and a substantially uniform thickness no greater than approximately 0.015 inch.

12. An improved insulating system as in claim 11, in which said wall will not cold flow or creep under pressure after the slot sections of said coil are inserted in said slots.

13. An improved insulating system as in claim 11, in which the wall of each said tubes comprises multiple layers of very thin polyimide film bonded together by fluorinated ethylene propylene resin.

14. For insulating an armature coil in a dynamoelectric machine having a rotor which comprises a commutator formed by a cylindrical array of discrete electroconductive segments at one end of the rotor, an armature head at the other end of the rotor, a cylindrical core of magnetizable material disposed between said commutator and armature head, said core including a plurality of axially extending slots in its periphery, and a plurality of multiple turn armature coils physically disposed in the slots of said core and electrically connected to selected commutator segments, each armature coil comprising a bundle of at least four parallel, separately insulated conductors arranged in quadrature with respect to each other, the distal ends of said conductors being adapted to be connected to a predetermined set of said commutator segments, each of said conductors having a generally rectangular cross section and said bundle being bent to form a generally rectilinear winding having first and second relatively long and straight slot sections that are adapted to be inserted in two separate slots of said rotor core, said first and second slot sections being surrounded by dielectric material and being respectively joined at their armature head ends to first and second shorter sections which form obtuse angles therewith and which in turn extend convergently to the outboard end of the armature head where they join one another via an acutely bent loop, an improved insulating system comprising insulating means disposed inside said bundle for separating said four conductors from one another at least in the vicinity of said obtuse angles and of said loop, said insulating means comprising a pre-formed unitary member of substantially non compressible, non-thermoplastic dielectric material having a cross-shaped cross section and being thin and flexible enough to bend in any plane without appreciable loss of either its physical integrity or its electrical insulating properties.

15. An improved insulating system as in claim 14, in which said pre-formed member comprises at least two layers of polyimide film bonded together by fluorinated ethylene propylene resin.

16. An improved insulating system as in claim 14 for a coil in which the distal ends of said conductors are interconnected in a manner that forms, in said bundle of conductors, four turns in series with each other.

17. An improved insulating system as in claim 16 for a coil in which each of said turns comprises at least two parallel conductors.

18. An improved insulating system as in claim 14, in which said pre-formed member extends along the whole length of both of said slot sections of said coil, along the whole length of both of said shorter sections, and along said loop.

* * * * *